United States Patent
Seidman et al.

(10) Patent No.: US 11,627,287 B2
(45) Date of Patent: Apr. 11, 2023

(54) SYSTEM AND METHOD FOR IDENTITY DISCOVERY

(71) Applicant: KIANNA ANALYTICS INC., Sunnyvale, CA (US)

(72) Inventors: Glenn R. Seidman, Woodside, CA (US); Nader Fathi, Sunnyvale, CA (US); Sebastian Andreatta, Palo Alto, CA (US); Battogtokh Baasanjav, Daly City, CA (US)

(73) Assignee: KIANA ANALYTICS INC., Sunnyvale, CA (US)

( * ) Notice: Subject to any disclaimer, the term of this patent is extended or adjusted under 35 U.S.C. 154(b) by 249 days.

(21) Appl. No.: 17/037,464

(22) Filed: Sep. 29, 2020

(65) Prior Publication Data

US 2021/0099677 A1    Apr. 1, 2021

Related U.S. Application Data

(60) Provisional application No. 62/908,368, filed on Sep. 30, 2019.

(51) Int. Cl.

| | |
|---|---|
| *H04N 7/18* | (2006.01) |
| *H04W 4/029* | (2018.01) |
| *H04W 4/021* | (2018.01) |
| *G06F 16/22* | (2019.01) |
| *G06F 16/29* | (2019.01) |
| *G06V 20/52* | (2022.01) |
| *G06V 40/16* | (2022.01) |

(52) U.S. Cl.
CPC ........ *H04N 7/181* (2013.01); *G06F 16/2228* (2019.01); *G06F 16/29* (2019.01); *G06V 20/52* (2022.01); *G06V 40/172* (2022.01); *H04W 4/021* (2013.01); *H04W 4/029* (2018.02)

(58) Field of Classification Search
CPC ..................................................... H04N 7/181
See application file for complete search history.

(56) References Cited

U.S. PATENT DOCUMENTS

2018/0302414 A1* 10/2018 Wagner ................. H04L 63/107

* cited by examiner

*Primary Examiner* — Daniel T Tekle
(74) *Attorney, Agent, or Firm* — Lewis Roca Rothgerber Christie LLP (57) ABSTRACT

System and method include: receiving location information about a mobile device; creating trackable data structures; determining a movement path of the mobile device; receiving image streams from a plurality of cameras; identifying one or more cameras in the movement path; identifying relevant image streams from the identified one or more cameras in relevant to a time and location of the mobile device in the movement path, by associating the image timestamps from the identified one or more cameras with the location and the tracking timestamps of the trackable data structures in the movement path; wherein each identified relevant image stream includes a confidence level of relevance to trackable data structures in the movement path; and displaying the movement path of the mobile device and the identified relevant image streams that include a confidence level higher than a predetermined threshold on a map on a display screen.

20 Claims, 9 Drawing Sheets

SYSTEM AND METHOD FOR IDENTITY DISCOVERY

CROSS-REFERENCE TO RELATED APPLICATIONS

This Patent Application claims the benefits of U.S. Provisional Patent Application Ser. No. 62/908,368, filed on Sep. 30, 2019, and entitled "System And Method For Identity Discovery," the entire content of which is hereby expressly incorporated by reference.

FIELD OF THE INVENTION

The disclosed invention relates generally to security monitoring and forensics; and more particularly to system and method for identity discovery.

BACKGROUND

Physical security monitoring and forensics has become a significant concern in the past two decades. With the heightened need for security services in public and private environments, there has been an exponential growth of information, such as videos, images, location coordinates, mobile device identification and the like, that needs to be reviewed, analyzed and filtered to maintain basic security monitoring. The accelerated pace of security information infrastructure is also placing demands on how to monitor and analyze all the information that is being collected (e.g., streamed) and stored. Video information is a key component in security and law enforcement to identify and track criminal and suspicious behavior. In most instances, the amount of video footage available at a typical site far exceeds the ability of the manpower needed to review it at the time of occurrence of an event.

SUMMARY

In some embodiments, the disclosed invention is a system and method for identity discovery that is capable of collecting images, videos, image/video coordinates, unique device identification, such as, media access control (MAC) addresses and Mac address coordinates for mobile devices and mobile device users. The disclosed invention is capable of collecting the above information from a variety of devices, such as hotspots, cameras, mobile devices, profiles, and/or historical data.

In some embodiments, the disclosed invention is a method for identity discovery in a geographical zone. The method includes: receiving location information about a mobile device used by a user and a unique device identification of the mobile device, over a wireless computer network; creating a plurality of trackable data structures including unique device identification and location data of the mobile device and corresponding tracking timestamps; determining a movement path of the mobile device utilizing the created trackable data structure; receiving image streams from a plurality of cameras within the geographical zone, wherein each camera includes a predetermined location information of said each camera, and wherein the image streams include image timestamps; identifying one or more cameras in the movement path among the plurality of cameras by associating the movement path with the predetermined location information of each of the plurality of cameras; identifying relevant image streams from the identified one or more cameras in the movement path relevant to a time and location of the mobile device in the movement path, by associating the image timestamps from the identified one or more cameras with the location and the tracking timestamps of the trackable data structures in the movement path; wherein each identified relevant image stream includes a confidence level of relevance to trackable data structures in the movement path; and displaying the movement path of the mobile device and the identified relevant image streams that include a confidence level higher than a predetermined threshold on a map on a display screen.

In some embodiments, the disclosed invention is a system for identity discovery in a geographical zone. The system includes: a sever computer for: receiving location information about a mobile device used by a user and a unique device identification of the mobile device, over a wireless computer network, creating a plurality of trackable data structures including unique device identification and location data of the mobile device and corresponding tracking timestamps, determining a movement path of the mobile device utilizing the created trackable data structure, receiving image streams from a plurality of cameras within the geographical zone, wherein each camera includes a predetermined location information of said each camera, and wherein the image streams include image timestamps, identifying one or more cameras in the movement path among the plurality of cameras by associating the movement path with the predetermined location information of each of the plurality of cameras, and identifying relevant image streams from the identified one or more cameras in the movement path relevant to a time and location of the mobile device in the movement path, by associating the image timestamps from the identified one or more cameras with the location and the tracking timestamps of the trackable data structures in the movement path; wherein each identified relevant image stream includes a confidence level of relevance to trackable data structures in the movement path; and a display screen for displaying the movement path of the mobile device and the identified relevant image streams that include a confidence level higher than a predetermined threshold on a map.

In some embodiments, the disclosed invention is a method for identity discovery in a geographical zone. The method includes: receiving location information about a mobile device used by a user and a unique device identification of the mobile device, over a wireless computer network; creating a plurality of trackable data structures including unique device identification and location data of the mobile device and corresponding tracking timestamps; determining a movement path of the mobile device utilizing the created trackable data structure; receiving location information about a plurality of other mobile devices, over the wireless computer network, creating a plurality of trackable data structures including unique device identification and location data of the plurality of other mobile devices and corresponding tracking timestamps; determining a movement path for each of the plurality of other mobile devices utilizing the created trackable data structure of the plurality of other mobile devices; and determining one or more of the other mobile devices that were in proximity of the movement path of the mobile device, wherein proximity parameters include distances for the proximity, time periods for duration of each proximity, and the size and type of the geographical zone.

In some embodiments, the disclosed invention identifies a face image in the identified relevant image streams associated with the user of the mobile device and displaying the face image on the display screen. In some embodiments, the disclosed invention determines one or more of visitors' traffic in the geographical zone, duration of mobile device stay in the geographical zone, physical and web locations visited by visitors in the geographical zone, and details from, application used, and web browsing actions, by the visitors in the geographical zone, from the associated image timestamps and tracking timestamps.

BRIEF DESCRIPTION OF THE DRAWINGS

A more complete appreciation of the disclosed invention, and many of the attendant features and aspects thereof, will become more readily apparent as the disclosed invention becomes better understood by reference to the following detailed description when considered in conjunction with the accompanying drawings in which like reference symbols indicate like components.

DETAILED DESCRIPTION

In some embodiments, the system and method of disclosed invention link location and user information from mobile devices with video/image data streams from a wireless network and/or from storage devices and captures the timestamp details from the video/image streams. The disclosed invention then provides rapid analysis and real time predictive/alert information as well as forensic details for analysis. Using analysis of information captured from mobile device users allows insights into visitor behavior patterns and are used for forensic, contact tracing and context analysis of the users and/or events.

Furthermore, all the information (e.g., photos, videos, image coordinates, unique device identification, for example, media access control (MAC) addresses and Mac address coordinates) from the time of the event can be packaged in data structures for electronic delivery to law enforcement, security, health, insurance, product promotion and other organizations for further analysis and actions.

Figure 1:
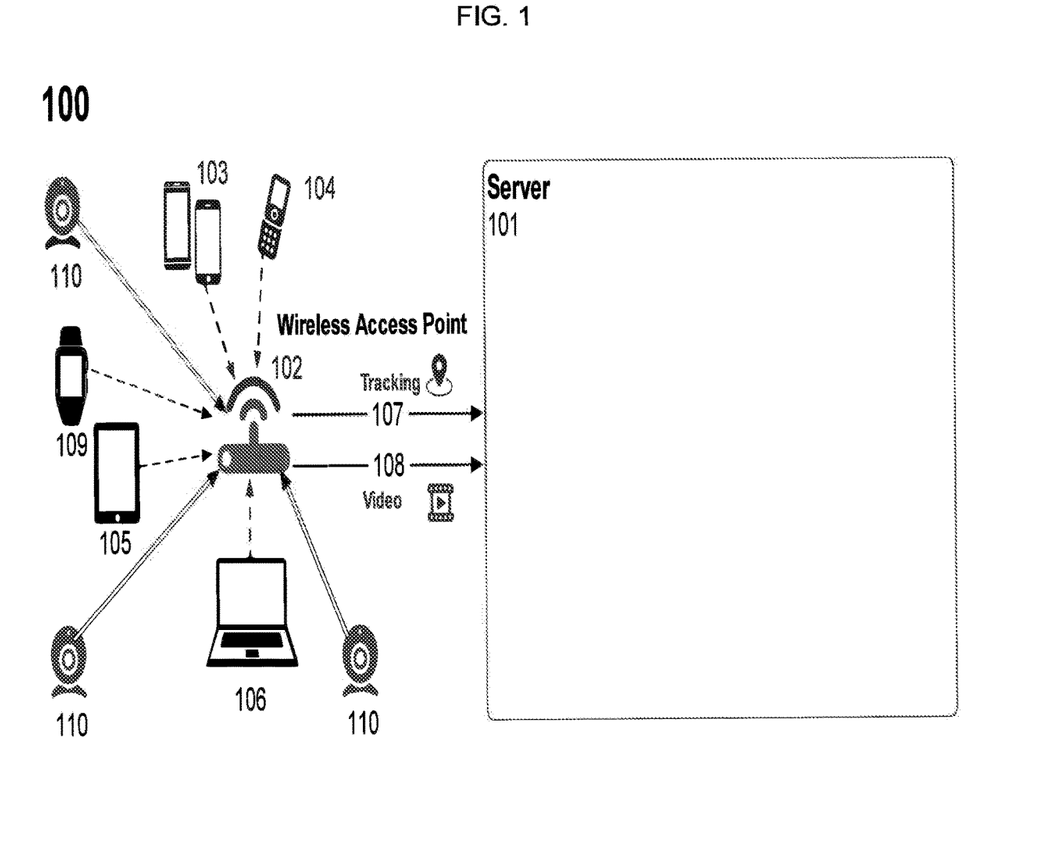
FIG. 1 Illustrates an exemplary environment, according to some embodiments of the disclosed invention.

FIG. 1 Illustrates an exemplary environment, according to some embodiments of the disclosed invention. As shown, a server 101 may function as a listener to data streams of information in a wireless area network 102. The streams of information arrive as tracking data (including location coordinates) 107 and video (or image) data 108. The Tracking data 107 is generated by any wireless device such as smartphone 103, simple cellphone 104, tablet 105, laptop 106, smart watch 109, or any other similar devices. Multiple video streams are also generated, for example, one video stream per camera 110, which may be deployed in a specific locale (geographical zone).

The server 101 intelligently processes these streams to produce data structures for many objects that represent an aggregated and organized data structure of tracking and video clip segments in various meaningful ways to represent a "story" or scenario. The data structures may further include image/video coordinates, unique device identification, for example, MAC addresses and Mac address coordinates for mobile devices.

The server 101 provides a complete detail of different scenarios on various specific objects of interest. Examples of objects of interest include: a person, a group of people, a camera's viewpoint, and specific areas or regions of interest. In some embodiments, the server combines this information with timestamped video information recorded by cameras 110 and other video/audio capture devices, if any. By accessing the recorded video information from a database (e.g., one or more video recording storage devices) connected to the Internet or receiving video/image, the disclosed invention facilitates quick analysis and filtering of video streams of individuals involved in a targeted event and/or locale and display them on a single screen to show both the locations of individuals on a map and the associated video streams from cameras in the path of the individuals to view their progress.

In some embodiments, the invention depicts predicted behavior of the mobile device user (e.g., a predicted future or past path of the user) on a map on a display screen. The predicted behavior can also include where the user has been within a certain time period and which other mobile device users have been in the "proximity" of the user. The information for the other mobile devices in proximity of the user may be obtained similarly and stored in a storage device. For example, a plurality of trackable data structures including unique device identification and location data of other mobile devices and corresponding tracking timestamps are created, the movement path of the other mobile devices is determined utilizing the created trackable data structures. In some embodiments, one or more of the other mobile devices that were in proximity of the movement path of the mobile device are identified in order to perform contact tracing.

In some embodiments, the parameters for the "proximity" are adjustable depending on the objective of the analysis, for example, contact tracing or security related scenarios. In some embodiments, the parameters include one or more distances for the proximity and time periods for the duration of each proximity (distance), the size and nature (type) of the geographical zone, and the like. For example, if a geographical zone or a portion thereof is an inside area, such as a building, airport, or a concert venue, the proximity distance and the time periods may be smaller, while for a larger and/or outside geographical zone or a portion thereof, such as streets, open sports or concert venues or ant outdoor space, the proximity distance and the time periods may be larger.

The predicted behavior may also be displayed on a screen along with any associated video/image streams for a certain time and/or locale. The disclose invention is capable of associating a face found on a video snippet (data structure) with a Mac Address and position of a mobile device. This is particularly beneficial when one doesn't know the specific identity of the individual with a given unique device identification, such as a Mac Address.

In some embodiments, in addition to image and location coordinates information, further information is determined on visitors' traffic on the site, duration of their stay on the site, physical and web locations visited by them, and details from WiFi login, applications used, and web browsing actions. In some embodiments, the information is captured in real time for immediate application to analytics, security, services and/or products. In some embodiments, pooling information from different sources (point of sales terminals, iBeacon devices and/or WiFi access points) enables the disclosed invention to analyze the identity and behavior of the visitors and predict what the visitors will do or have done, based on different metrics and prior visits to the site or other sites. This information can be used for security/law enforcement services, object or person tracking on site (child, equipment, cleaning crew, VIP) and site layout, contact tracing, marketing services and offers. The information can also be used by the location staff for different goals such as inventory/product placement and management, staffing support and scheduling, isolating people based on their contacts with certain people or locations, and therefore improves inventory management, labor and employee management technologies, security and identification technologies, contact tracing technologies and lost-and-found technologies, for example.

Figure 2:
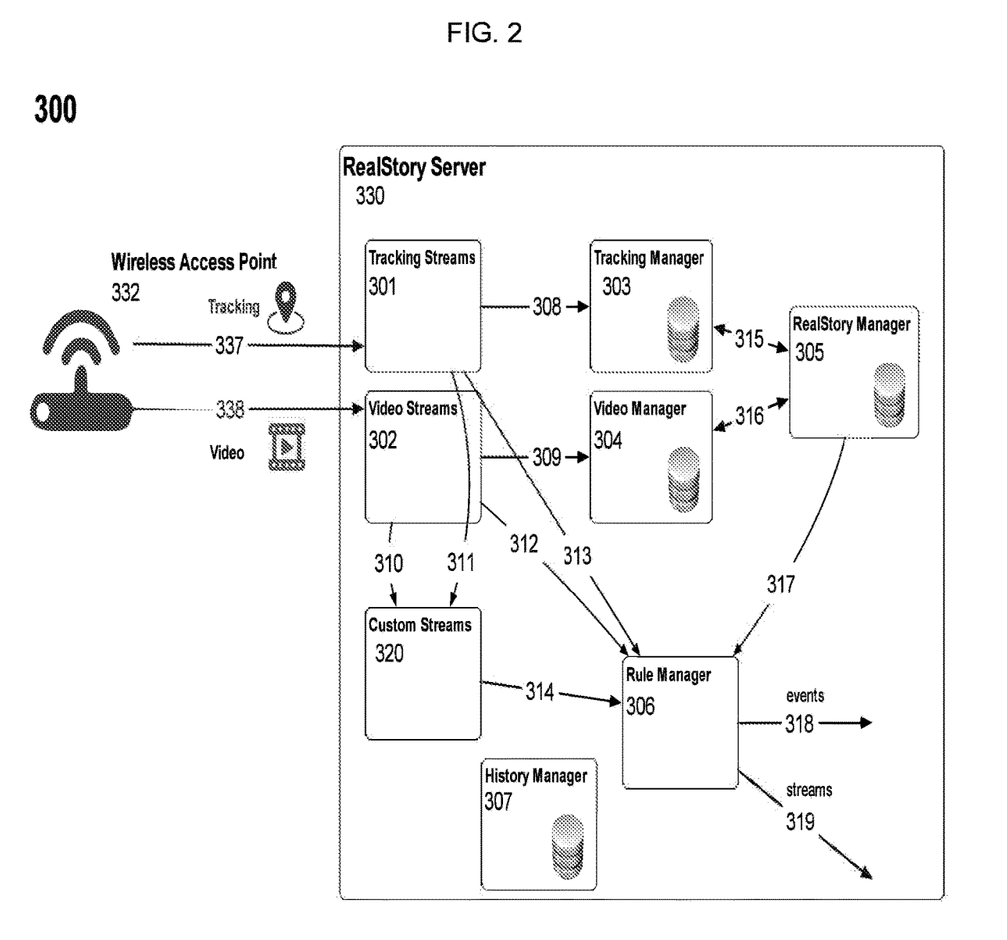
FIG. 2 depicts exemplary subsystems of a server, according to some embodiments of the disclosed invention.

FIG. 2 depicts exemplary subsystems of a server, according to some embodiments of the disclosed invention. As shown, a server 330 continuously listens to one or more wireless access points 332 for the incoming tracking information 337 and video/image data streams 338. A tracking streams subsystem 301 and a video streams subsystem 302 preserve the order of the incoming tracking and video data in the order they arrive (for example, timestamping them) so that the incoming events can be examined for further processing by a custom streams subsystem 320 or a rule manager 306. The custom streams subsystem 320 provides the means to deploy custom processing to transform the raw tracking stream 301 and raw video stream 302 into other kind of meaningful data streams/structures, as custom streams. Some examples of custom streams include: only specific unique device identification (e.g., Mac Addresses), only positions that are in a specific area, only positions that demonstrate fast movement, only video clips with at least 2 persons for 15 minutes, any combination thereof, and the like. All of these data streams are directed (312, 313, and 314) to a rule manager 306 which in turn, emits events 318 and/or additional streams 319 of events.

The rule manager 306 is able to recognize specific events or patterns of events, which may even be restricted to occur in a time window, in order to create further events 318 and streams 319 of events. The rule manager 306 may also employ state 317 from the RealStory Manager 305. RealStory Manager 305 references and retrieves stored video clips and location coordinates as necessary to store and maintain "Trackable" and "Showable" objects, described below. Tracking manager 303 stores the incoming data from the tracking streams 301. Similarly, a video/image manager 304 stores the incoming video streams 309. In some embodiments, all subsystems log occurrences that take place to maintain an audit via a History Manager 307. The RealStory Manager 305 also maintains the ability to retrieve (315, 316) the necessary tracking, coordinates, Mac addresses and video objects from their respective managers (303 and 304), as necessary.

In some embodiments, the disclosed invention collects this information about the people per geographical zones and utilizes certain data structure to automatically associate/correlate the photos and videos to specific unique device identifications, such as, MAC addresses. In some embodiments, geographic zones are identified, using various known method, for example, selecting them on a map, providing coordinates, address postal zip codes or the name of the venue. The zones may be placed in any location and be in any shape. In some embodiments, zones are placed, "sized and shaped" in such a way as to identify and capture traffic of people of interest at a particular location or venue, and/or to understand which person is in a restricted area. Zone location and shape may also be drawn to understand which person entered a specific zone area and subsequently entered another zone area. Such geographical zones may further be modified during deployment to accommodate various changing requirements.

TABLE 1 presents some examples of various cases for which, the information is collected at an arbitrary start time "Time 0" and the information collected at a subsequent later time "Time 1." In some embodiments, for each such case, the process deduces how many Face→Macs are known and an associated confidence level (percentage) for each is detailed. For example, the cases detailed in TABLE 1 focus on event sequences which either begin with or end with one person in an area, or which have many persons not moving at all. This assists with logical reasoning about which faces belong to which coordinate collected. Such logical reasoning is what the present disclosure refers to as "logical association processing." For example, when there is a time instance with one MacAddress data structure and one Photo data structure to show, these are associated together. Then at another time instant where the one MacAddress data structure didn't move at all, but there is another MacAddress present, the non-moved photo in the $2^{nd}$ time instant can be associated with the same MacAddress and then the $2^{nd}$ new with the new $2^{nd}$ MacAddress. The identical kind of logical association reasoning is what determines which Face photos match with which MacAddresses in each case listed.

In some embodiments, the data structure of each series of unique device identification (e.g., Mac address), its coordinates (x, y, z), and the timestamp is referred to as a "Trackable," as it represents the tracking of a single device. Moreover, the data structure of each series of photos/videos for a Trackable is referred to as a "Showable." TABLE 2 presents an example of the structure of both the Trackable and Showable for some embodiments of the disclosed invention. As presented in TABLE 2, some cases incorporate a Showable structure with a photo of a human face from a larger scene. The larger scene comes from a photo referred to in the "inPhoto" field and/or from a video clip frame. If the scene is obtained from a video clip, this video clip too is referenced in the "inVideoClip" field. Additionally, the position and size of the photo rectangle is stored in the structure with photoPositionX, photoPositionY, along with photoSizeX, and photoSizeY. The actual photo rectangle is stored in the "photo" field of the data structure. In some embodiments, there may also be a "timestamp" field in the data structure.

In some embodiments, the disclosed invention synchronizes a Showable to a Trackable. While Showables and Trackables are initially independent and unassociated, once logical association processing over two or three time periods determines that a specific Showable needs to be associated with a specific Trackable, the two are synchronized and associated with each other. As mentioned previously, the association can be determined by logical reasoning of one person in an area at the beginning or end of a time period, or by observing video slices where no one moves. This means that the synchronized photos and/or videos represent what the Trackable physically looks like. In some cases, the precise Showable data structure can't be definitely determined for a specific Trackable data structure and therefore the system still collects the possible photos/videos for a Trackable for which it has determined that it is likely one of a few photos/videos. When the system detects that there are still multiple possible photos/videos for a specific Trackable, the multiple possible media is referred to as a "Fuzzy Showable."

For example, suppose three people are travelling together and enter a train station together in Zone "Alpha". They are close together while walking, so their unique device identifications (MAC addresses) are reporting pretty much the same coordinate at each time. The collected video for the Zone Alpha shows the three persons walking together. The video processing realizes three rectangles cut-out with everyone's head. However, a conventional system cannot know which MAC address belongs to which cut-out photo (person). According to the disclosed invention, each Trackable representing one of the individuals has all three Showables associated because each of the three cut-out photos is a possibility. Together, the three Showable association to one Trackable comprises a "Fuzzy" Showable. Once the persons travelling together split up sufficiently apart, they are distinctly associated.

TABLE 1 below illustrates examples of different use case classifications for given Trackable(s) and Showable(s). The table also shows the confidence levels attainable for Trackable-to-Showable associations. While many of the cases have near 100% confidence level, in some cases it may not be known which of N photos to associate with a specific MacAddress and therefore the confidence level would be 1/N. Where there are many photos that can match (rather than a specific single photo being a match), the multiple possible are still stored and associated (Fuzzy Showable) with the MAC address until further information is obtained to rule out some photos. For the few photos that are possible matches, association is easily determined. When multiple MAC addresses are found with multiple persons extracted from an associated video, without video position analysis, one cannot know which photo cut-out is associated with which MAC address. It can only be known that one of few photo cut-outs are possible. The classifications are presented in order of least information first.

Assuming that two photos can be processed for matching at distinct times to determine if they are the same person or not regardless of their orientation in the photo. We call the operation that does this: photoMatch( ) and assume that this function has a probability of matching correctly: matchPercent of the time. It is expected that this probability of matching is 100% or nearly 100%. Additionally, some environments support the ability to correlate photo rectangles in a camera viewport by their position and size to a geolocation. This correlation requires calibration of the camera viewport to real world positions. This data structure is defined as photoToGeoPositionMatch( ). Since there can be overlap of many photos in the same place while geopositions are still different, particularly in depth, this function has a probability of matching correctly as: matchPhoto2GeoPositionPercent of the time.

TABLE 1.

| Classification | Trackable Count in Zone @Time0 | Trackable Count in Zone @Time1 | Details | Mac Address Position ? | Video Position to Geo Position Correlation? | Face -> Mac Confidence | #Face→ Macs Known | Process |
|---|---|---|---|---|---|---|---|---|
| One | 1 | 1 | | no | no | match Percent | 1 | Only possibility is that both photos associate with the 1 MAC address |
| One then Two | 1 | 2 | | no | no | match Percent | 2 | First MAC address is associated to the one photo. Using photoMatch( ) with the 1 Time 0 photo, we know which Time1 photo associates to First MAC address. Thus, we know which photo associates to $2^{nd}$ MAC address. We associate both photos with that MAC address and the alternate photo with the new $2^{nd}$ MAC address. |
| Many disappear leaving one | Many | 1 | | no | no | match Percent | 2 | The one MAC address left at Time 1 will have one photo left at the same time and so it is associated. We also photoMatch( ) this 1 photo with all the photos from Time 0. The one that is best match is also associated with the MAC address. |
| Many but 1 doesn't move | Many | Many | 1 doesn't change position | yes | no | match Percent | 1 | We don't have VideoPosition to GeoPosition but we do have Photo (X, Y) position on Camera Viewport. We associate the one Photo that didn't move at all on Camera Viewport with the one MAC address that didn't move. We associate the one non-moving photo with the one non-moving MAC address. |
| Many but no one moves | Many | Many | no one changes positions | yes | no | 1/count (Many) | none | Every photo is apossibility for each MAC address so each Photo is associated with each MAC address and given probability of 1/count(Many) |

TABLE 1.-continued

| Classification | Trackable Count in Zone @Time0 | Trackable Count in Zone @Time1 | Details | Mac Address Position ? | Video Position to Geo Position Correlation? | Face -> Mac Confidence | #Face→ Macs Known | Process |
|---|---|---|---|---|---|---|---|---|
| Many Then Few don't change position | Many | Few | Few don't change position | yes | no | 1/count (Few) | none | Of the Few non-moving photos, each is a possibility for each MAC address of the Few that didn't move. So each of these Few Photos is associated with each of the "Few" MAC address and given probability of 1/count(Few). Meanwhile, the rest of the MAC addresses that did move may be associated probabilistically the same way with the group of photos in the Many minus Few group. |
| Many don't change position with video & geo position correlation | Many | Many | Many don't change position | yes | yes | match Photo 2 Geo Position Percent | Many | With photoToGeoPositionMatch( ), we match and associate each photo with its associated MAC address. |
| Many but all may move | Many | Many | May all move | yes | yes | match Photo 2 Geo Position Percent$^2$ * match Percent | Many | With photoToGeoPositionMatch( ), we match and associate each photo with its associated MAC address in Time 0 and Time 1. We confirm the 2 photos belonging to the same MAC address and associate both photos with the MAC address when confirmed with photoMatch( ). MAC address having not matching photosare still associated with the photos but assigned probabilities corresponding to 50% for each photo. |
| Many reduces to Few all may move | Many | Many | May all move | yes | yes | match Photo 2 Geo Position Percent$^2$ * match Percent | Many | Same as above |

TABLE 2

| Object | Structure |
|---|---|
| Trackable | macAddress: String<br>x: double<br>y: double<br>z: double<br>timestamp: Timestamp |
| Showable | photo: BLOb (JPEG or other)<br>inPhoto: String (URL to photo or video frame of whole scene where photo rectangle is cut out from)<br>inVideoClip: String (URL to videoclip's stored location)<br>photoPositionX: int (horizontal pixel)<br>photoPositionY: int (vertical pixel)<br>photoSizeX: int<br>photoSizeY: int<br>timestamp: Timestamp |

Figure 3:
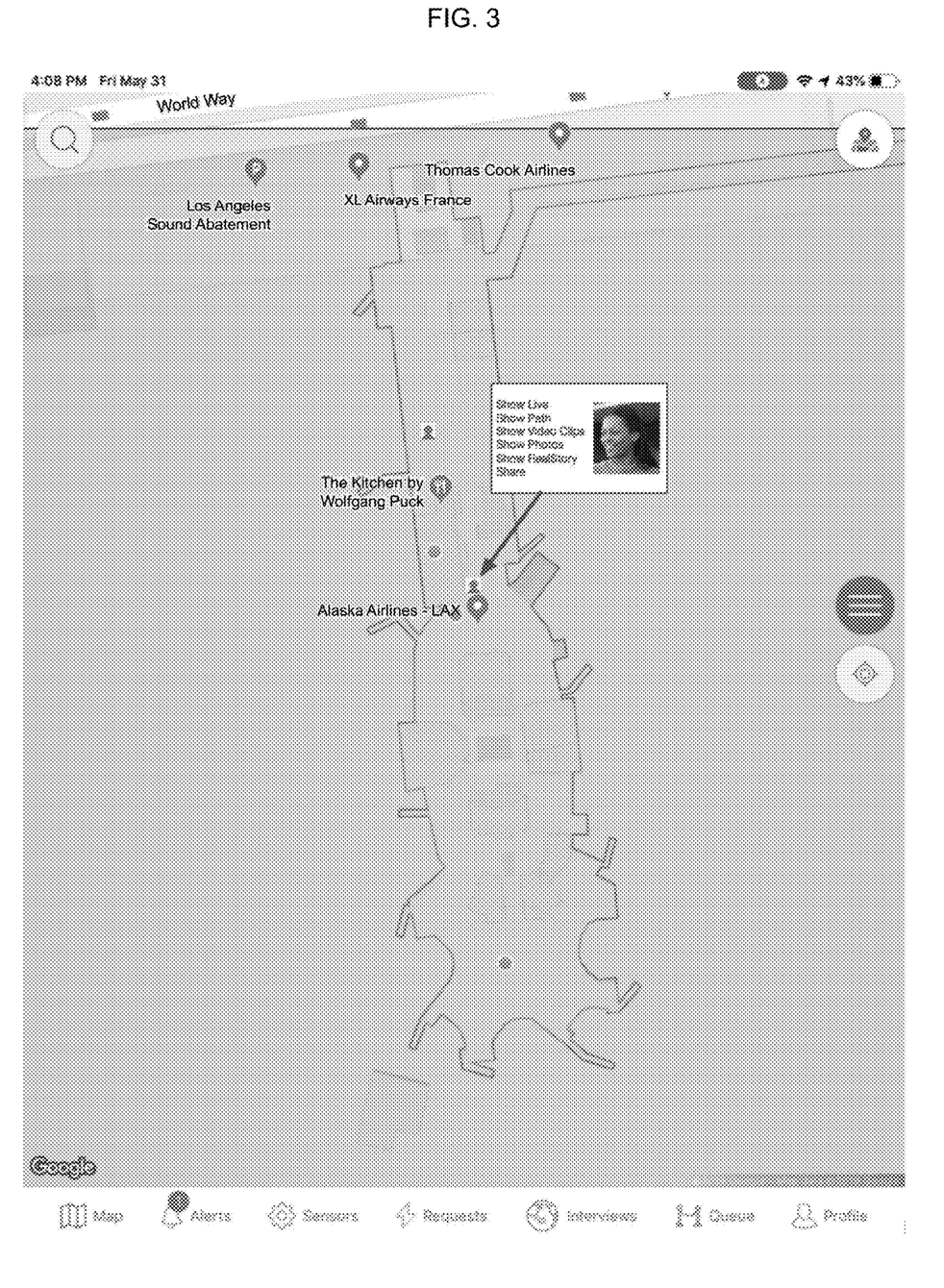
FIG. 3 shows a user interface screen including a map with "Hover," according to some embodiments of the disclosed invention.

FIG. 3 shows a user interface screen including a map with "Hover," according to some embodiments of the disclosed invention. As shown, any Mac addresses that have been determined to have a 100% probability, or matchPercent, of an associated Face Photo is depicted as a small picture frame icon. However, the disclosed invention can also support a configuration parameter where the icon is depicted if the probability is above a specific threshold, for example, 95%. While photoMatch( ) discussed earlier answers true if it determines that two photos at two distinct times are the same person, the probability that it is the correct match is known as the matchPercent and is close to 100%. However, due to lighting, camera angle, or other factors, the photoMatch( ) process designer may realize that matchPercent is much lower than 100% or simply some other percentage. The determination of this percentage would be relative to that process and could be a system parameter. The threshold to use for placing a photo icon is up to the person using the invention but it should be lower than matchPercent, otherwise an icon will never be shown. The "Hover" capability is a light touch on a picture frame icon which then shows the small dialog with actual determined photo. From here, there are multiple links. The link options (shown in FIG. 3) are Show Live, Show Path, Show Video Clips, Show Photos, Show RealStory, and Share, each of which cause a display of the relevant information on the display.

In some embodiments, when touching a point with a "deep touch" the screen shown next appears with the Mac address properties. When the photo is probabilistically not known yet, the probable photos with percent probabilities are depicted in the "FACES" section of the screen, as shown, in FIG. 4, which shows possible face photos founds and the percentages.

Figure 4:
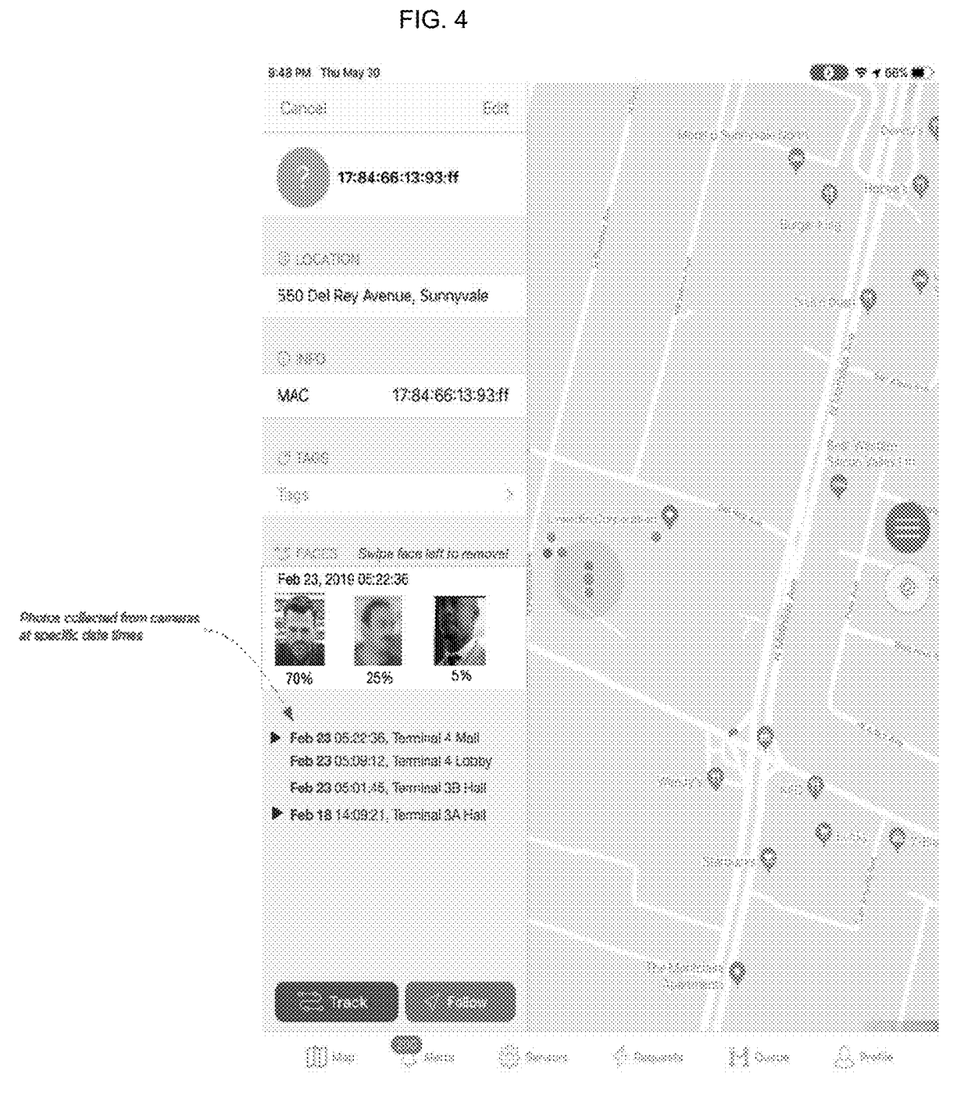
FIG. 4 illustrates a user interface screen including Mac address properties according to some embodiments of the disclosed invention.

FIG. 4 illustrates a user interface screen including Mac address properties according to some embodiments of the disclosed invention. Real Mac addresses already found are shown with their properties. A more detail description of how a real Mac address can be obtained is found in a co-owned U.S. Pat. No. 9,998,907, entitled "Method and Apparatus for Uniquely Identifying Wireless Devices," the entire content of which is hereby expressly incorporated by reference. In some embodiments, data packets are received from one or more wireless access points; unique device identifications are identified from the received data packets, each identified unique device identification is timestamped; repetitive or false unique device identifications are determined in the received identified unique device identification; the repetitive or false unique device identifications are then eliminated in the identified unique device identification to obtain accurate unique device identifications.

The new section added is "FACES" which shows one or more row of three faces determined to be possible faces associated with the Mac address along with probability, when one Face not certain. In some embodiments, a Face that is determined not to be the one with high probability (i.e. probability is too low) may be removed. When removed, the probabilities of the remaining faces may be recomputed. For example, when video position to geo position analysis is absent and when there are N Face rectangle photos in a scene, then the probability for each Face rectangle photo to each Mac Address corresponding to the scene photo is 1/N.

When video position to geo position analysis is available, some embodiments realize the association of each Face to a specific Mac Address exactly, unless there are multiple Face rectangle photos appearing on top of each other in a scene. When there is any overlap of Face rectangle photos, some embodiments make a conservative decision to consider that the M Face photos that overlap are each a possible association to each of the M corresponding Mac Addresses.

Figure 5:
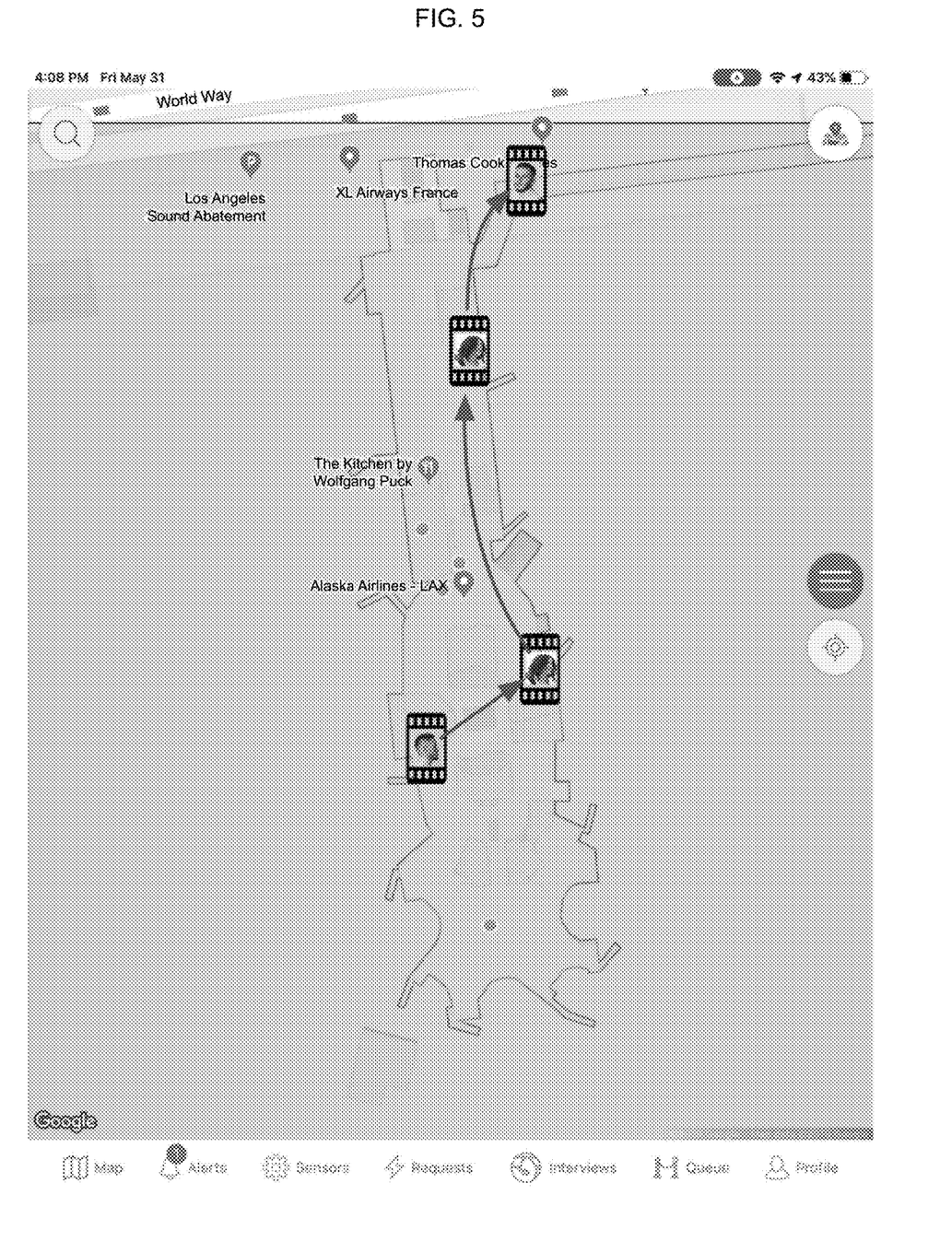
FIG. 5 shows a user interface screen including real Mac address travel path with collected "Faceshots" data structure, according to some embodiments of the disclosed invention.

FIG. 5 shows a user interface screen including real Mac address travel path with collected "Faceshots" data structure, according to some embodiments of the disclosed invention. The travel path shows where (coordinates of) photos have been collected superimposed on a map. The face within the photo or video collected that has the highest probability is depicted in a photo/video icon. Touching the face in a photo/video icon displays a zoomed-up version of the photo or video, which may have multiple faces. In some embodiments, the Face with highest probability is the one where video position analysis matches up best with the collected MAC address coordinate collected. Since the person may be nearby multiple other persons, their Face rectangles are also collected and shown as possibilities until one Face is confirmed.

Figure 6:
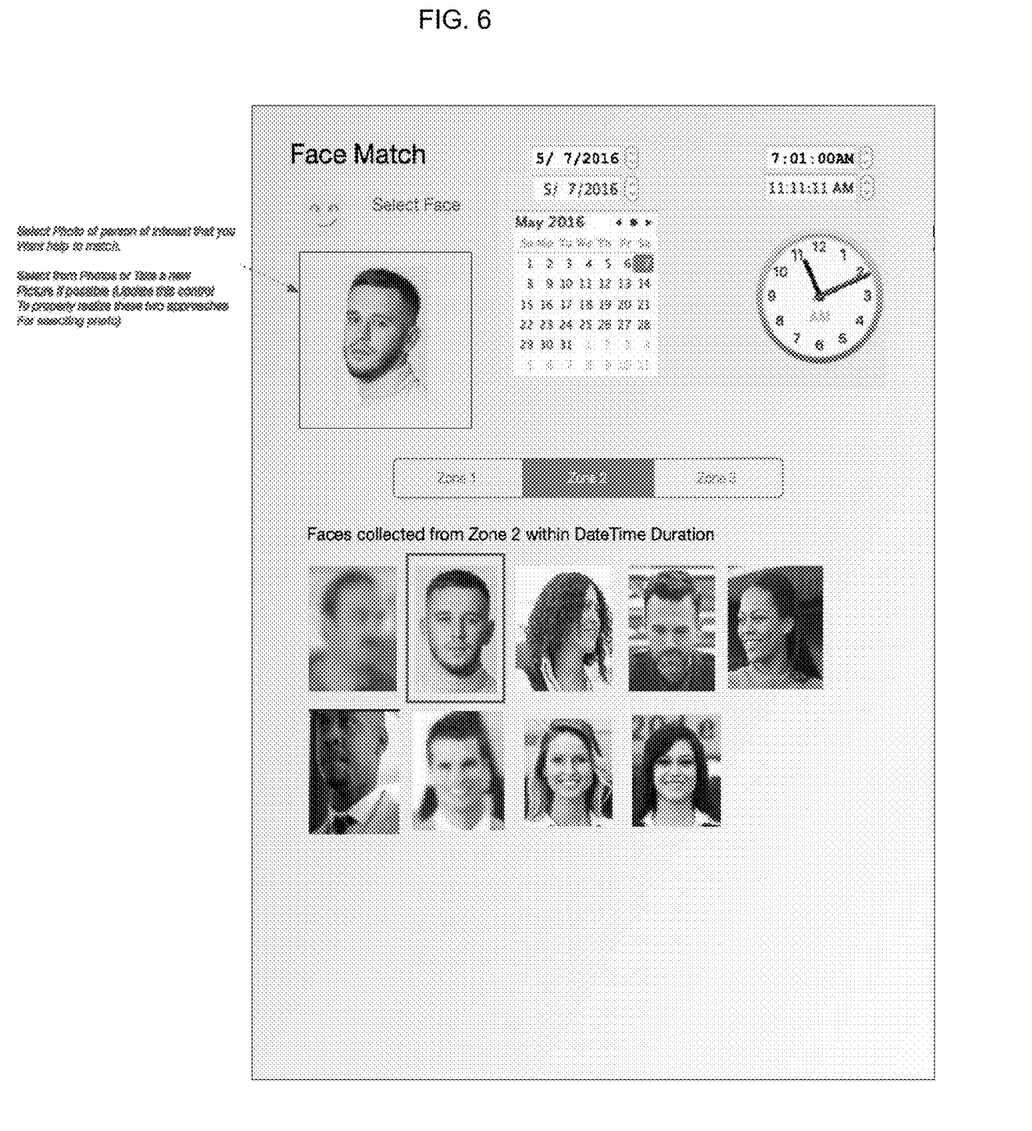
FIG. 6 depicts a user interface screen including "Face Match," according to some embodiments of the disclosed invention.

FIG. 6 depicts a user interface screen including "Face Match," according to some embodiments of the disclosed invention. When a face photo of person of interest is already available (the face photo on the top left), selecting this photo displays the bestmatch from all of the faces collected within a particular zone. In some embodiments, the best matching Face is the one where video position analysis matches best with the MAC address coordinate collected. The faces collected within a zone may change depending on the date, time, and selected zones filter. The zone selection may be multiple rows and have the actual names of each zone. Multiple zones may be selected.

Figure 7:
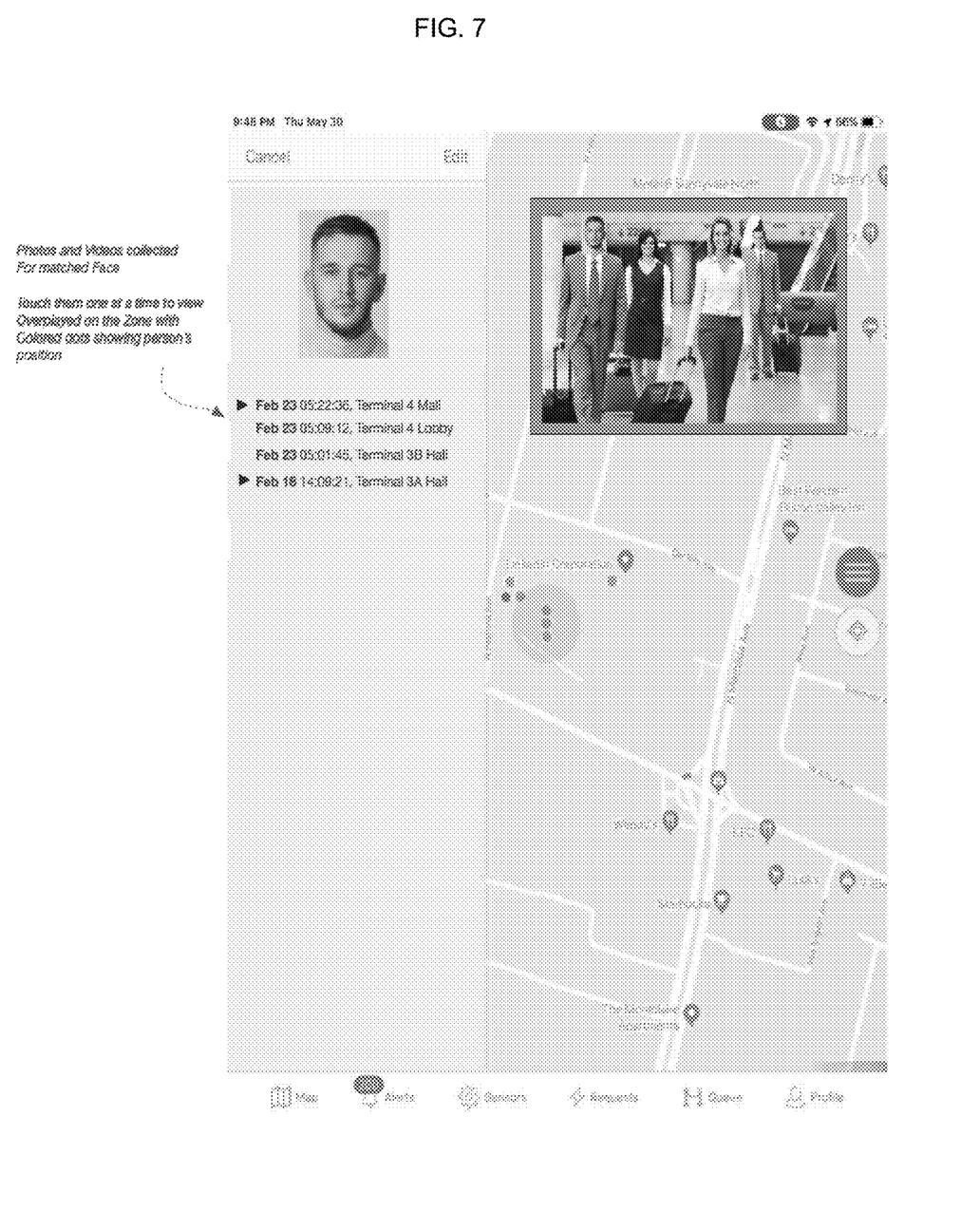
FIG. 7 illustrates a user interface screen including Mac address properties according to some embodiments of the disclosed invention.

FIG. 7 illustrates a user interface screen including Mac address properties according to some embodiments of the disclosed invention. Once a face is matched, all photos and videos collected for the matched photo are listed along with the zone where they were collected from. In some embodiments, specific camera(s) from which the images were collected and their location are also identified in this user interface. Activating a photo of a matched face shows the photo or plays the video, which may be overlaid on the map also showing where the person was at the time. In some embodiments, a "RealStory" of the person is also displayed. A more detail description of how a "RealStory" can be obtained is found in a co-owned U.S. Pat. No. 10,080,129, entitled "Method and Apparatus for Integrated Tracking of Visitors," the entire content of which is hereby expressly incorporated by reference. As described in the above-mentioned U.S. Pat. No. 10,080,129, a "RealStory" object comprises a list of TrackingEvents, list of VideoEvents, list of SocialEvents, list of AreaEvents, list of WebRequestEvents, list of PartnerEvents, list of Trackables, list of VideoCameras, list of SocialThreads, and list of Areas. Each of the lists include IDs that reference the objects uniquely.

Figure 8:
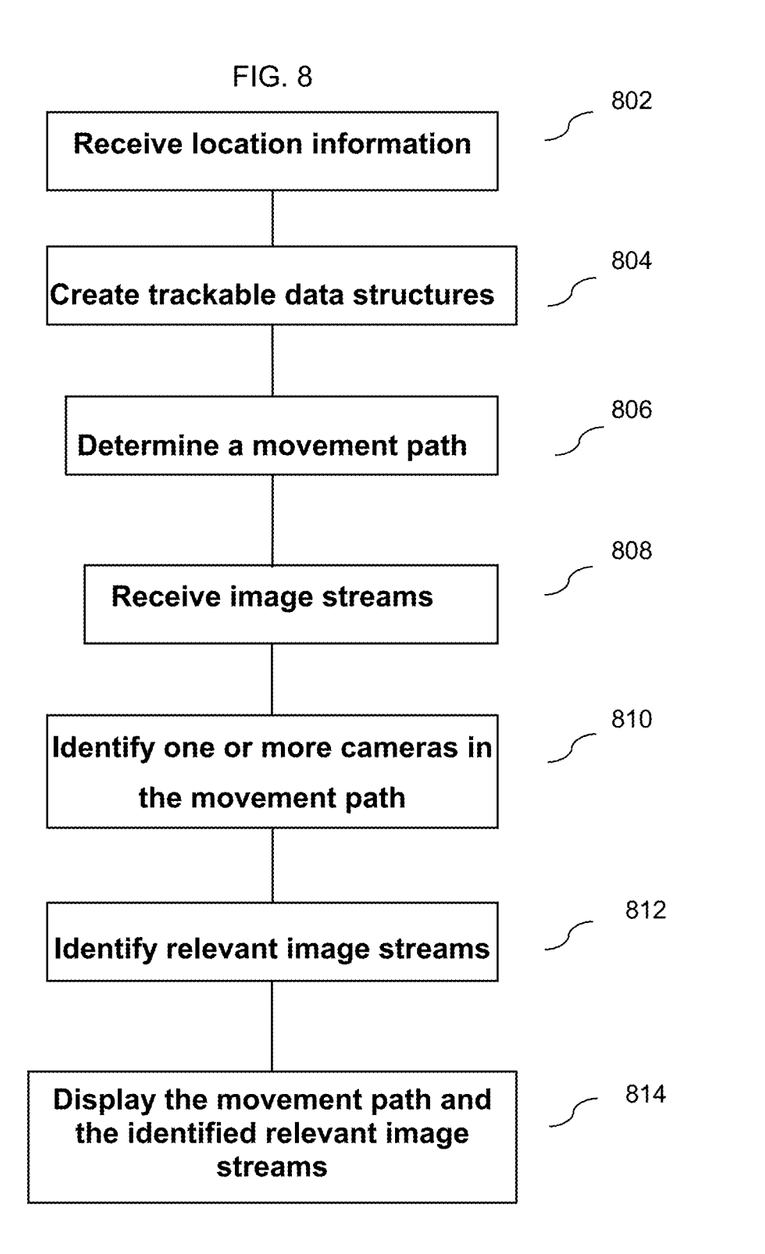
FIG. 8 is an exemplary process flow, according to some embodiments of the disclosed invention.

FIG. 8 is an exemplary process flow, according to some embodiments of the disclosed invention. As shown in block 802, location information about a mobile device used by a user and a unique device identification of the mobile device is received, for example, over a wireless computer network such a WiFi, Bluetooth, wireless hub, or similar networks. For example, the server 101 (in FIG. 1) may function as a listener to data streams of location information in a wireless area network 102. In some embodiments, the streams of location information arrive as tracking data including location coordinates. The Tracking data is generated by any wireless device. The unique device identification of the mobile device may be repetitive and include false information. In some embodiments, the repetitive or false unique device identifications are determined in the received identified unique device identification; the repetitive or false unique device identifications are then eliminated in the identified unique device identification to obtain accurate unique device identifications.

In block 804, a plurality of trackable data structures including unique device identification and location data of the mobile device and corresponding tracking timestamps are created. The trackable data structures may include unique device identification and location data for other mobile devices and corresponding tracking timestamps. In block 806, a movement path of the mobile device is created utilizing the trackable data structure, for example the time stamped sequence of locations of the mobile device. In some embodiments, one or more of the other mobile devices that were in proximity of the movement path of the mobile device are identified in order to perform contact tracing for the mobile device user.

In block 808, image streams (for example, video or still images) are received from a plurality of cameras within a geographical zone, where each camera includes a predetermined location information of said each camera, and wherein the image streams include image timestamps. In some embodiments, multiple video streams may also be generated and received, for example, one video stream per each camera, which may be deployed in a specific locale of the geographical zone. In block 810, one or more cameras that are in the movement path are identified by associating the movement path with the predetermined location information of each of the cameras. In block 812, relevant image streams from the identified one or more cameras in the movement path that relevant to a time and location of the mobile device in the movement path are identified, by associating the image timestamps from the identified one or more cameras with the location and the tracking timestamps of the trackable data structures in the movement path. Each identified relevant image stream includes a confidence level of relevance to trackable data structures in the movement path. For example, a higher confidence level indicates a higher relevance to the trackable data structures in the movement path. In some embodiments, associating image timestamps with tracking timestamps is performed by logical reasoning of the mobile device in the geographical zone at a beginning or end of a time period, or by observing image slices where no one moves in the image streams.

In block 814, the movement path of the mobile device and the identified relevant image streams that include a confidence level higher than a predetermined threshold are displayed on a map on a display screen, similar to depictions in FIGS. 3, 4 and/or 5. Some embodiments, a Showable structure with a photo of a human face from a larger scene may also be displayed on or along the map with the movement path. For example, a face image in the identified relevant image streams associated with the user of the mobile device may be identified and displayed on the display screen. This way, one or more of visitors' traffic in the geographical zone, duration of mobile device stay in the geographical zone, physical and web locations visited by visitors in the geographical zone, and details from, application used, and web browsing actions, by the visitors in the geographical zone may be determined from the associated image timestamps and tracking timestamps.

Figure 9:
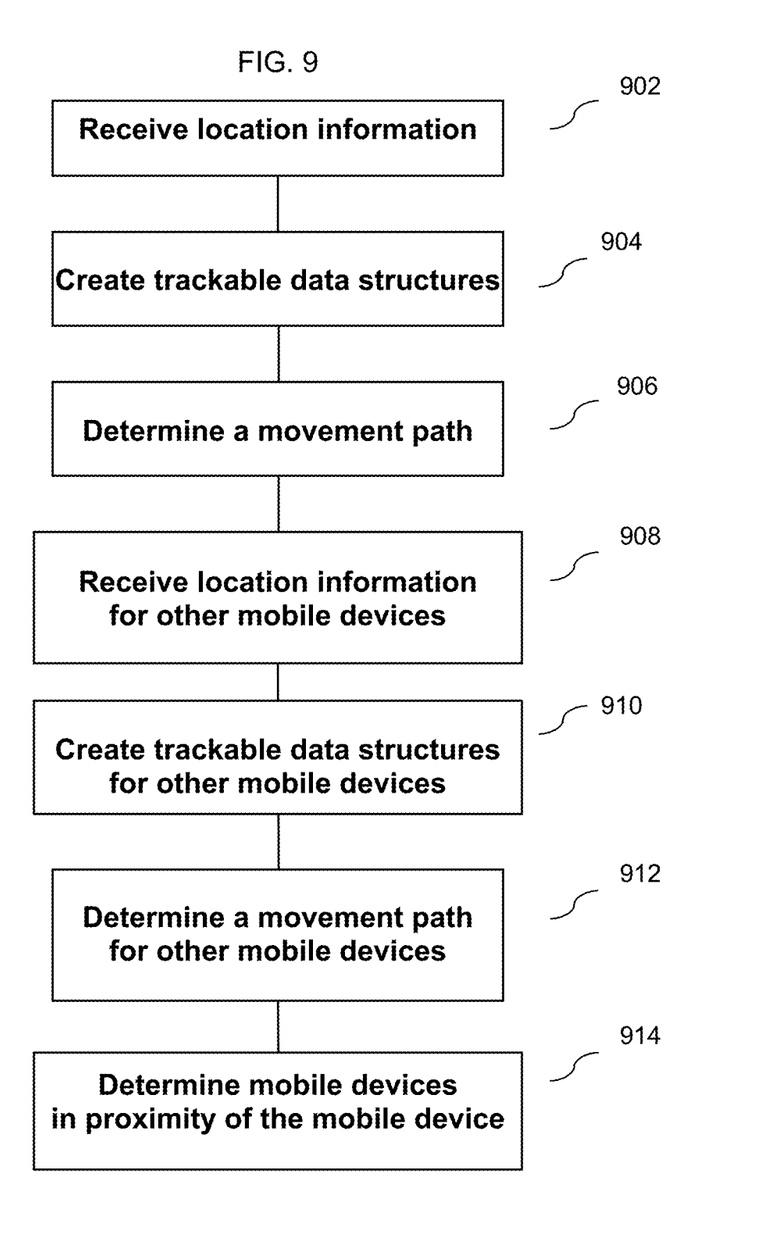
FIG. 9 is an exemplary process flow, according to some embodiments of the disclosed invention.

FIG. 9 is an exemplary process flow, according to some embodiments of the disclosed invention. As shown in block 902, location information about a mobile device used by a user and a unique device identification of the mobile device is received, for example, over a wireless computer network such a WiFi, Bluetooth, wireless hub, or similar networks. For example, the server 101 (in FIG. 1) may function as a listener to data streams of location information in a wireless area network 102. In some embodiments, the streams of location information arrive as tracking data including location coordinates. The Tracking data is generated by any wireless device. The unique device identification of the mobile device may be repetitive and include false information. In some embodiments, the repetitive or false unique device identifications are determined in the received identified unique device identification; the repetitive or false unique device identifications are then eliminated in the identified unique device identification to obtain accurate unique device identifications.

In block 904, a plurality of trackable data structures including unique device identification and location data of the mobile device and corresponding tracking timestamps are created. The trackable data structures may include unique device identification and location data for other mobile devices and corresponding tracking timestamps. In block 906, a movement path of the mobile device is created utilizing the trackable data structure, for example the time stamped sequence of locations of the mobile device.

In block 908, location information about a plurality of other mobile devices is received, over the wireless computer network and a plurality of trackable data structures including unique device identification and location data for each of the plurality of other mobile devices and corresponding tracking timestamps are created in block 910, similar to the above-described process. In block 912, a movement path for each of the plurality of other mobile devices is determined using the created trackable data structures for plurality of other mobile devices, similar to the above-described process. In block 914, one or more of the other mobile devices that were in proximity of the movement path of the mobile device is determined. The parameters for the proximity include distances for the proximity, time periods for duration of each proximity, and the size and type of the geographical zone. This way, one or more other mobile devices that were in proximity of the movement path of the mobile device are identified in order to perform contact tracing for the user of the mobile device.

In some embodiments, the photo associated with a MAC address is not a person (or her mobile device), but rather, an object of interest, such as an automobile, bus, car, ship, plane, or other transportation. It might also be an unattended device. For various transportation, it might be a license plate, or other identifiers. Many video management systems support extraction of vehicles and/or license plates, not necessarily unattended devices. In any case, MAC address geo-positions may be correlated with the video positions using matchPhoto2GeoPosition( ) and when considering transportation, multiple MAC addresses associate with the same photo, the photo of the transportation vehicle they used to ride. This still tells a story of where the subjects were and who they were with. For vehicle associations, where video management systems have the ability, a photo of the license plate may also be associated and displayed.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims and drawings.

What is claimed is:

1. A method for identity discovery in a geographical zone, the method comprising:

receiving location information about a mobile device used by a user and a unique device identification of the mobile device, over a wireless computer network;

creating and storing a plurality of trackable data structures including unique device identification and location data of the mobile device and corresponding tracking timestamps for the mobile device;

selecting a time period from a first time to a second time for movements in the geographical zone;

determining a movement path of the mobile device for the selected time period from the first time to the second time, by accessing the stored trackable data structure;

identifying two or more cameras in the movement path for the selected time period among, a plurality of cameras each including a location information, by associating the movement path for the selected time period with the location information and the corresponding time stamps for the mobile device of each of the plurality of cameras;

identifying relevant image streams from the identified two or more cameras in the movement path relevant to a time and location of the mobile device in the movement path, by associating the image timestamps from the identified two or more cameras with the location and the corresponding tracking timestamps of the trackable data structures in the movement path for the selected time period; wherein each identified relevant image stream includes a confidence level percentage of relevance to trackable data structures in the movement path, and wherein a higher confidence level percentage indicates a higher relevance to the trackable data structures in the movement path; and displaying the movement path of the mobile device and only the identified relevant image streams that include a confidence level percentage higher than a predetermined threshold, on a map on a display screen.

2. The method of claim 1, further comprising identifying a face image in the identified relevant image streams associated with the user of the mobile device and displaying the face image on the display screen.

3. The method of claim 1, further comprising determining one or more of visitors' traffic in the geographical zone, duration of mobile device stay in the geographical zone, physical and web locations visited by visitors in the geographical zone, and details from, application used, and web browsing actions, by the visitors in the geographical zone, from the associated image timestamps and tracking timestamps.

4. The method of claim 1, wherein associating image timestamps with tracking timestamps is performed over a plurality of time periods.

5. The method of claim 1, further comprising determining where the user has been within a certain time period.

6. The method of claim 1, further comprising:
receiving location information about a plurality of other mobile devices, over the wireless computer network,
creating a plurality of trackable data structures including unique device identification and location data of the plurality of other mobile devices and corresponding tracking timestamps;
determining a movement path of the plurality of other mobile devices utilizing the created trackable data structure; and
determining one or more of the other mobile devices that were in proximity of the movement path of the mobile device.

7. The method of claim 6, wherein parameters for the proximity of the movement path include adjustable distances and adjustable time periods within the distance, and a size and type of the geographical zone.

8. The method of claim 1, wherein the unique device identification is a media access control (MAC) address of the mobile device.

9. The method of claim 1, further comprising:
timestamping each identified unique device identification;
determining repetitive or false unique device identifications in the received unique device identification; and
eliminating the repetitive or false unique device identifications to obtain an accurate unique device identification.

10. The method of claim 1, further comprising sizing and shaping the geographic zone in such a way as to identify and capture traffic of people of interest at a particular location or venue, and/or to understand which person is in a restricted area.

11. A system for identity discovery in a geographical zone comprising:
a sever computer for:
receiving location information about a mobile device used by a user and a unique device identification of the mobile device, over a wireless computer network,
creating and storing a plurality of trackable data structures including unique device identification and location data of the mobile device and corresponding tracking timestamps for the mobile device,
selecting a time period from a first time to a second time for movements in the geographical zone;
determining a movement path of the mobile device for the selected time period from the first time to the second time, by accessing the stored trackable data structure,
identifying two or more cameras in the movement path for the selected time period among, a plurality of cameras each including a location information, by associating the movement path for the selected time period with the location information and the corresponding time stamps for the mobile device of each of the plurality of cameras, and
identifying relevant image streams from the identified two or more cameras in the movement path relevant to a time and location of the mobile device in the movement path, by associating the image timestamps from the identified two or more cameras with the location and the corresponding tracking timestamps of the trackable data structures in the movement path for the selected time period; wherein
each identified relevant image stream includes a confidence level percentage of relevance to trackable data structures in the movement path, and wherein a higher confidence level percentage indicates a higher relevance to the trackable data structures in the movement path; and
a display screen for displaying the movement path of the mobile device and only the identified relevant image streams that include a confidence level percentage higher than a predetermined threshold on a map.

12. A method for identity discovery in a geographical zone, the method comprising:
receiving location information about a mobile device used by a user and a unique device identification of the mobile device, over a wireless computer network;
creating and storing a plurality of trackable data structures including unique device identification and location data of the mobile device and corresponding tracking timestamps for the mobile device;
selecting a time period from a first time to a second time for movements in the geographical zone;
determining a movement path of the mobile device for the selected time period from the first time to the second time, by accessing the stored trackable data structure;
receiving location information about a plurality of other mobile devices, over the wireless computer network,
creating and storing a plurality of trackable data structures including unique device identification and location data of the plurality of other mobile devices and corresponding tracking timestamps for the plurality of other mobile devices;
determining a movement path for each of the plurality of other mobile devices for the selected time period from the first time to the second time, accessing the created trackable data structure of the plurality of other mobile devices; and
determining one or more of the other mobile devices that were in proximity of the movement path of the mobile device, wherein proximity parameters include distances for the proximity, time periods for duration of each proximity, and the size and type of the geographical zone, wherein the trackable data structures for the plurality of other mobile devices include a confidence level percentage of relevance to trackable data structures in the movement path of the mobile device, and wherein a higher confidence level percentage indicates a higher relevance to the trackable data structures in the movement path of the mobile device.

13. The method of claim 12, further comprising:

receiving image streams from a plurality of cameras within the geographical zone, wherein each camera includes a predetermined location information of said each camera, and wherein the image streams include image timestamps;

identifying one or more cameras in the movement path among the plurality of cameras by associating the movement path with the predetermined location information of each of the plurality of cameras;

identifying relevant image streams from the identified one or more cameras in the movement path relevant to a time and location of the mobile device in the movement path, by associating the image timestamps from the identified one or more cameras with the location and the tracking timestamps of the trackable data structures in the movement path; wherein each identified relevant image stream include a confidence level of relevance to trackable data structures in the movement path; and displaying the movement path of the mobile device and the identified relevant image streams that include a confidence level higher than a predetermined threshold on a map on a display screen.

14. The method of claim 12, further comprising identifying a face image in the identified relevant image streams associated with the user of the mobile device and displaying the face image on the display screen.

15. The method of claim 12, further comprising determining one or more of visitors' traffic in the geographical zone, duration of mobile device stay in the geographical zone, physical and web locations visited by visitors in the geographical zone, and details from, application used, and web browsing actions, by the visitors in the geographical zone, from the associated image timestamps and tracking timestamps.

16. The method of claim 12, wherein associating image timestamps with tracking timestamps is performed over a plurality of time periods.

17. The method of claim 12, further comprising predicting a behavior of the mobile device user on the map on a display screen, wherein the predicted behavior includes where the user has been within a certain time period.

18. The method of claim 12, wherein associating image timestamps with tracking timestamps is performed by observing image slices where no one moves in the image streams.

19. The method of claim 12, wherein the unique device identification is a media access control (MAC) address of the mobile device.

20. The method of claim 12, further comprising:

timestamping each identified unique device identification;

determining repetitive or false unique device identifications in the received unique device identification; and eliminating the repetitive or false unique device identifications to obtain an accurate unique device identification.

* * * * *